Aug. 9, 1938.  J. W. WHITE  2,126,237
METHOD OF MAKING HYDRAULIC CYLINDERS
Filed Jan. 27, 1936  2 Sheets-Sheet 1
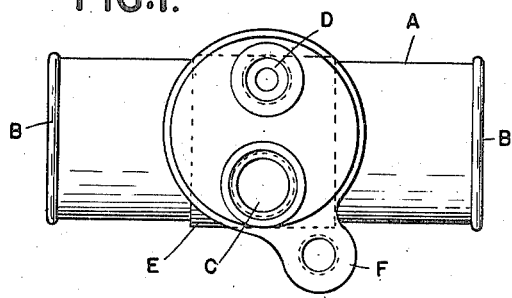
FIG.I.
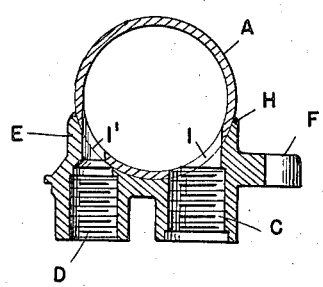
FIG.3.
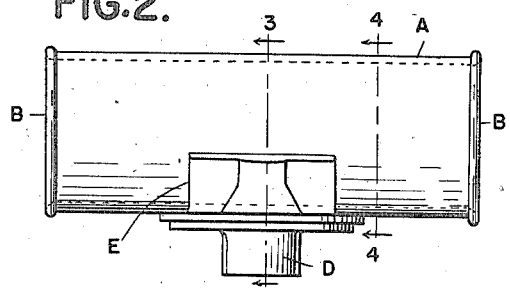
FIG.2.
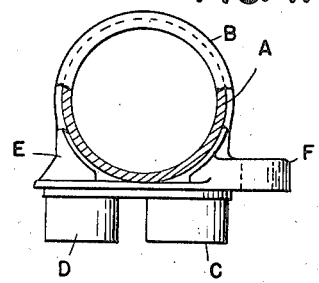
FIG.4.
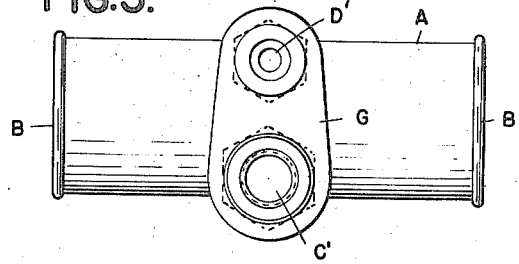
FIG.5.
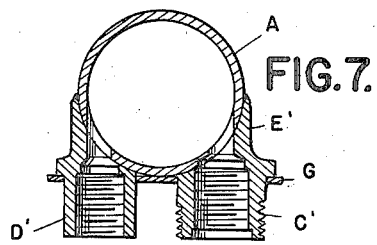
FIG.7.
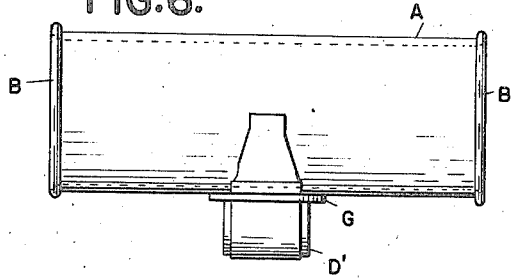
FIG.6.
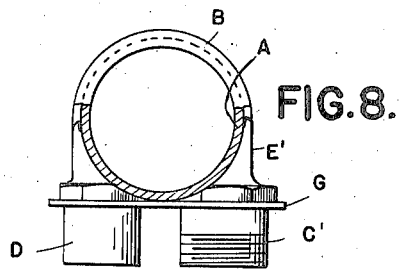
FIG.8.
*INVENTOR*
JOHN WILLIAM WHITE
BY Whittemore Hulbert
Whittemore & Belknap
*ATTORNEYS*

Aug. 9, 1938.   J. W. WHITE   2,126,237
METHOD OF MAKING HYDRAULIC CYLINDERS
Filed Jan. 27, 1936   2 Sheets-Sheet 2

INVENTOR
JOHN WILLIAM WHITE
ATTORNEYS

Patented Aug. 9, 1938

2,126,237

UNITED STATES PATENT OFFICE 2,126,237

METHOD OF MAKING HYDRAULIC CYLINDERS

John William White, Detroit, Mich., assignor to Kelsey-Hayes Wheel Company, Detroit, Mich., a corporation of Delaware Application January 27, 1936, Serial No. 61,081

7 Claims. (Cl. 29—152.1)

The invention relates to hydraulic cylinders such as are used in connection with hydraulic brake systems for actuating the wheel brake mechanism. Such cylinders as usually constructed are adapted for mounting within the brake drum upon the brake backing plate and have formed integral therewith one or more nipples passing through the backing plate for connection with the fluid supply conduit and air bleed. Also, with certain constructions employing elastic sealing cups, it is necessary to provide within the cylinder annular seats for these cups and clamping means for securing the same. It is the object of the present invention to obtain an improved and simplified construction and a method of manufacturing the same at reduced cost. To this end, the invention consists in the construction and method as hereinafter set forth.

In the drawings:

Figure 1 is a side elevation and Figure 2 is a plan view of a hydraulic cylinder of my improved construction;

Figures 3 and 4 are cross sections respectively on lines 3—3 and 4—4 of Figure 2;

Figures 5, 6, 7 and 8 are views respectively similar to Figures 1 to 4 showing a modified construction;

In the constructions illustrated in Figures 1 to 8, A is the cylinder proper preferably formed of seamless tubing and provided at its opposite ends with slightly flared portions B. C is an inlet nipple for the hydraulic fluid and D another nipple constituting an air bleed. With the specific construction shown in Figures 1 to 4, these two nipples are formed integral with a saddle portion E having an arcuate surface for fitting about the cylinder A. This may be either a casting or a forging and also preferably has formed integral therewith a lug or ear F for securing the structure to the backing plate. With the constructions shown in Figures 5 to 8, the nipples C' and D' are separately formed, each being provided with an arcuate portion E' for fitting the surface of the cylinder. These two members C' and D' are then held in proper relation to each other by a plate G which has spaced apertures for receiving the same. The members C' and D' may be readily formed on a screw machine or other automatic machine and thus can be manufactured at very low cost. Also, with the construction shown in Figures 1 to 4, the cost of forming the two nipples integral with the saddle is less than where these parts are also integral with the cylinder.

To assemble the parts, the portions E or E' are properly positioned against the outer wall of the cylinder A and are then tacked thereto preferably by spot-welding at points H. The structure is then completed by brazing or hydrogen welding the parts to each other and by boring ports I and I' through the cylinder in alignment respectively at the nipples C and D.

Figure 9:
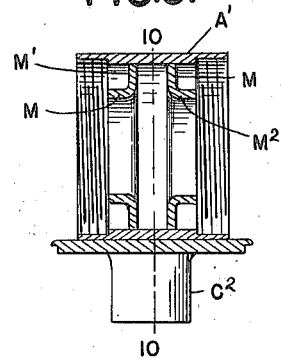
Figure 9 is a longitudinal section through another modification.
Figure 10:
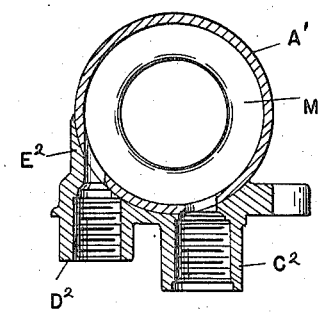
Figure 10 is a transverse section on line 10—10 of Figure 9.
Figure 11:
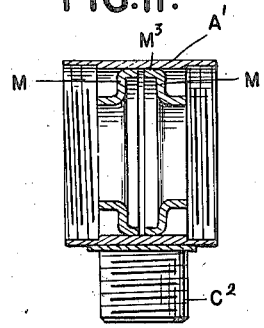
Figures 11 and 12 are views similar to Figures 9 and 10 showing still another modification.
Figure 12:
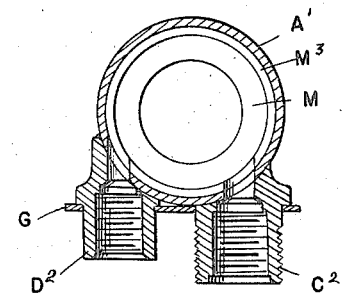
Figure 13:
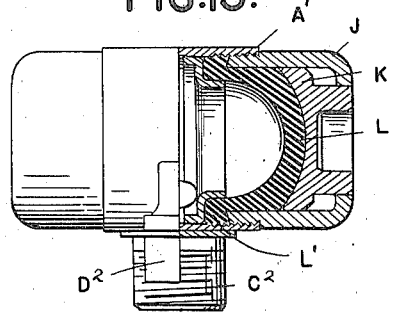
Figure 13 is a sectional plan view of the construction shown in Figures 11 and 12, as arranged in the complete hydraulic unit.

The modified constructions shown in Figures 9 to 12 are designed for use in an hydraulic unit of the construction illustrated in Figure 13. In the latter the nipples $C^2$ and $D^2$ are united to a short cylindrical tube A', the opposite ends of which are internally threaded for engagement with cylinder extensions J which receive the pistons K and the elastic cups L. These cups have peripheral flanges L' which engage annular seats formed within the tubular portion A' and are clamped thereto by the threaded cylinder extensions J. It is, therefore, necessary in the manufacture of this construction to provide the annular seats for the cupped flanges L' which are formed as follows: As shown in Figure 9, pressed sheet metal members M are formed with radially extending portions M' peripherally fitting within the tube A' and also having axially extending cylindrical portions $M^2$ of smaller radius than the tube A'. These annular members are pressed into the tube A' being positioned on opposite sides of the plane of the nipples $C^2$, $D^2$ and are then brazed or hydrogen welded to permanently secure them in this position. In Figure 11, another modification is shown where each of the members M is provided with a second cylindrical portion $M^3$ for press fitting within the tube A'. The inner ends of these portions $M^3$ are adjacent to each other and thus accurately space the members M. The construction shown in Figures 9 and 10 is also similar to the construction illustrated in Figures 1 to 4, in that the nipples $C^2$, $D^2$ are integral with each other and with a saddle piece $E^2$. The construction shown in Figures 11 and 12 is similar to the construction in Figures 5 to 8, in forming these nipples separate from each other and properly positioning the same by an apertured plate G. However, it is obvious that either of the constructions of cupped flange seat illustrated respectively in Figures 9, 10, 11 and 12 may be formed with either of the nipple constructions shown in these same figures.

What I claim as my invention is:

1. The method of forming hydraulic cylinders comprising, cutting a cylinder tube to the desired length, separately forming and machining a nipple with an arcuate surface corresponding in radius to the outer surface of said tube, tacking said nipple to said tube, then integrating the same to each other and aperturing said tube in registration with said nipple.

2. The method of forming hydraulic cylinders comprising, cutting a cylinder tube to the desired length, separately forming and machining a nipple with an arcuate surface corresponding in radius to the outer surface of said tube, hydrogen welding the parts to each other and aperturing said tube in registration with said nipple.

3. The method of forming hydraulic cylinders comprising, cutting the tube to the required length, separately forming and machining a pair of nipples having an arcuate surface corresponding in radius to the external surface of said tube, tacking these parts to each other, hydrogen welding to complete the integration thereof and aperturing the tube in registration with said nipples.

4. The method of forming hydraulic cylinders comprising, cutting the tube to the required length, forming separately from said tube and from each other a pair of nipples each provided with an arcuate surface of a radius corresponding to the external surface of the tube, engaging said nipples with an apertured plate to properly space the same, tacking the arcuate portions to said tube, hydrogen welding to complete the integration thereof and aperturing the tube in registration with said nipples.

5. The method of forming hydraulic cylinders comprising, cutting a tube to the required length, forming an annulus of pressed sheet metal with its periphery of a diameter to fit within said tube and integrating said parts with each other.

6. The method of forming hydraulic cylinders comprising, cutting a tube to the required length, pressing one or more annular seat members within said tube and hydrogen welding to integrate said seat members with the tube.

7. The method of forming hydraulic cylinders comprising, cutting a tube to the required length, separately forming a nipple provided with an arcuate surface of a radius corresponding to that of the outer surface of said tube, tacking the parts to each other, pressing a sheet metal annulus within the tube and hydrogen welding to integrate these members with each other.

JOHN WILLIAM WHITE.